Oct. 12, 1965 D. M. SMITH 3,212,007
OVERLOAD COMPENSATING DEVICE FOR INDUCTION METER INCLUDING
A CURRENT POLE FLUX SHUNT WITH SHORTED LOOP THEREON
Filed June 27, 1961
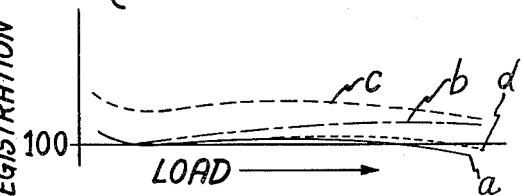
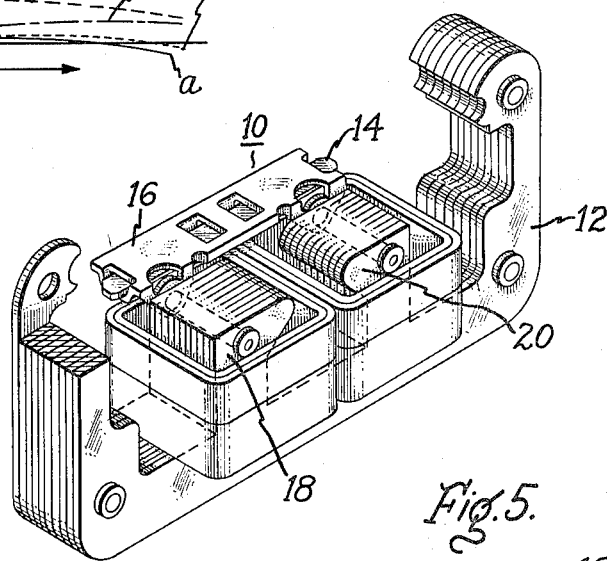
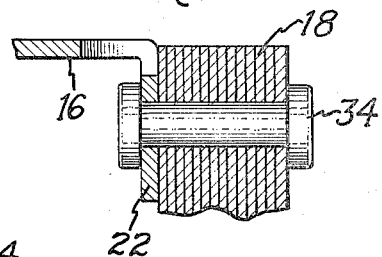
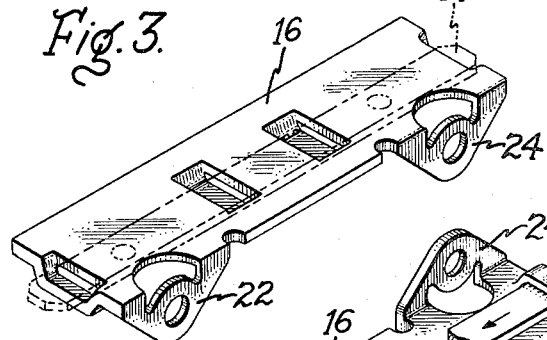
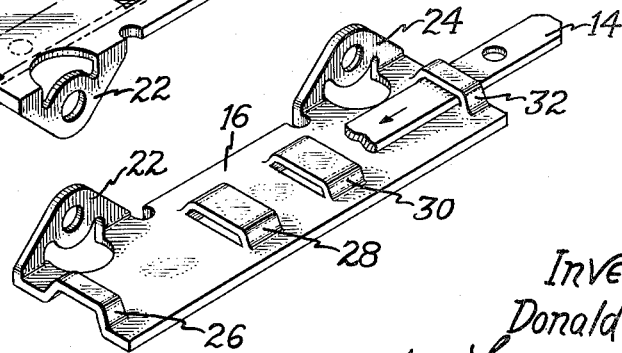
Inventor,
Donald M. Smith,
by Francis K. Doyle
His Attorney.

United States Patent Office 3,212,007
Patented Oct. 12, 1965

3,212,007
OVERLOAD COMPENSATING DEVICE FOR INDUCTION METER INCLUDING A CURRENT POLE FLUX SHUNT WITH SHORTED LOOP THEREON
Donald M. Smith, Berwick, Maine, assignor to General Electric Company, a corporation of New York
Filed June 27, 1961, Ser. No. 127,428
2 Claims. (Cl. 324—138)

This invention relates to an overload compensation device, and more particularly, to an overload compensation device for use with an induction meter, for example an induction meter of the type used to measure electrical energy in two phases of a three-phase power distribution system.

Three-phase systems are generally utilized in large cities to provide low voltage distribution of approximately 208 volts, which is taken from connections between two of the phases for utilization as an energy source for air conditioners and other heavy electrical appliances. At the same time, the light appliance loads, such as electric lights, refrigerators, and the like, can be supplied with the standard 120 volts by connections made beween one of the phases and the neutral line.

Conventional single stator three-wire 120/240 volt single phase watthour meters cannot be used to measure this network power for although such meters will correctly measure any 208 volt line-to-line power loads, the registration of the meter will only be 75% of the true value for any 120 volt line to neutral loads. This result stems from the fact that the phase of the line to neutral loads will be metered at the 208 volt capacity and at a 30° phase displacement, which would be a power factor of approximately 0.866 instead of the desired unity power factor. Further, as will be understood, the phase voltages are greater than one-half the line voltages, thus the meter registers only 75% of the true value of the actual power used with phase to neutral loads.

An improved single stator network meter of the type hereinbefore described, which may be used to measure correctly electrical energy in two phases of a three-phase system, has been previously disclosed in application Serial No. 98,803, which was filed March 28, 1961, in the names of William H. Morong, Jr., John F. Scammon, and Clifton A. Clarke, Jr., now Patent No. 3,150,317. The above application is assigned to the same assignee as this present application.

It has been discovered that during the overload of a single stator network meter, the registration of the electrical energy passing through the meter at a lagging power factor does not agree with the registration of an overload at unity power factor. Obviously, to more correctly measure all of the electrical energy which is used, it is desired that the registration at the lagging power factor be substantially the same as that which is measured at the unity power factor. Other induction meters also are known, which have a registration at overload with lagging power factor which does not agree with the registration at overload with unity power factor.

It is therefore an object of this invention to provide a compensating means for an induction meter that will improve the accuracy of the meter at overload.

It is a further object of this invention to provide an overload compensation device for a single stator network meter which will adjust the registration of such meter during overload at lagging power factor to be substantially the same as the registration of such meter during an overload at unity power factor.

In carrying out this invention in one form, an overload compensation device is provided for the current coil of an induction meter. The overload compensation device comprises a magnetic shunt means, which is connected to the current core of the meter. The shunt means is provided with a short circuit conducting loop which causes the flux in the shunt to lag the operating flux at rated load, thus increasing the registration of the lagging power factor with respect to unity power factor. However, during overload, due to the saturation of the shunt, the effect of the short circuit conducting loop is reduced, thereby lessening the lagging power factor registration with respect to unity power factor; thus substantially bringing the registration at lagging power factor into substantial conformance with the registration at unity power factor. In the preferred embodiment of this invention, the short circuit conducting loop is utilized as the mounting bracket to mount the magnetic shunt on the current core.

The invention which it is desired to protect, will be particularly pointed out and distinctly claimed in the claims appended to this application. However, it is believed that this invention and its objects and advantages, as well as other objects and advantages thereof, will be better understood from the following description when taken in connection with the accompanying drawing, in which:

FIGURE 1 is a series of curves showing the percent registration of an induction meter with respect to load at different power factors;

FIGURE 2 is a perspective view of a current core of an induction meter showing one form of this invention applied thereto;

FIGURE 3 is a perspective view of one form of the overload compensation device of this invention;

FIGURE 4 is a perspective view of the other side of the compensation device shown in FIGURE 3; and FIGURE 5 is a sectional view showing one form of attaching the compensation device of this invention to the current core.

Reference will now be made to the drawing in which like numerals are used to indicate like parts throughout. However, before describing the preferred embodiment of the invention in detail, it is believed that a brief discussion of the effects of registration of a load of lagging power factor on an induction meter, and the results which are obtained by the compensation device of this invention, will aid in an understanding of the problem which has been overcome by the compensation device of this invention.

Referring first to FIGURE 1, a series of curves is disclosed which represents the percent registration of an induction meter, for example a network meter, according to meter loads at different power factors. Considering first the solid line, which is labeled $a$ in FIGURE 1, this curve represents the percent registration of the meter at various loads and at unity power factor. As can be seen, this curve $a$ very closely approximates the 100% registration line. It will be noted from curve $b$, which represents the percent registration of the network meter with varying load, and at a lagging power factor of 0.5, that the curve very closely approximates curve $a$ at light loads but rapidly increases registration and thus rapidly diverges from curve $a$, and the 100% registration curve, at high loads, especially at overloads. As will be understood, this is due to the inherently fast overload performance at a lagging power factor of some induction meters, for example, the single stator network meter of Patent No. 3,150,317.

Considering now curve $c$, this curve represents the meter at a lagging power factor of 0.5 with the overload compensation device of this invention connected thereto. As can be seen, curve $c$ is substantially the same shape as the registration curve $a$ at unity power factor, being displaced therefrom. Considering curve $c$ with reference to curve $b$, it can be seen that at low loads and up to rated loads, that the effect of the short circuit conducting loop on the magnetic shunt, as provided by the invention herein, is to cause the shunt flux at rated load to lag, thus increasing the registration of the lagging power factor with respect to unity power factor. Thus the curve at the light and rated load end is displaced upwardly from the solid line, which represents the percent registration at unity power factor over the varying loads represented by the horizontal line. However, as will be noted, at heavy loads the saturation of the shunt reduces the lagging effect, thus the lagging power factor registration becomes slower with respect to the unity power factor line $a$ and, thus, curve $c$ begins to dip downwardly towards the unity power factor line $a$.

As will be readily understood by those skilled in the art, by proper calibration of the meter, the effect of the compensation device of this invention may be utilized and yet the curve $c$ may be displaced towards the 100% registration line such that, the registration line of the meter at a lagging power factor of 0.5 will take the form of the curve $d$. As can be seen, curve $d$ is substantially the same as the solid line curve $a$, which is the registration curve for unity power factor. Thus, as shown in FIGURE 1, by means of the overload compensation device of this invention the meter registration curve for the lagging power factor of 0.5 is brought into close co-ordination with the registration curve at unity power factor, that is, curves $a$ and $d$ are in substantial agreement with each other. Thus, it will be apparent that, with the overload compensation device of this invention, the registration curve, for a lagging power factor, may be brought into substantial agreement with the registration curve at unity power factor.

Reference will now be made to the remainder of the drawings for a detailed description of the preferred embodiment of the overload compensation device of this invention. Considering especially FIGURE 2, the overload compensation device of this invention, generally indicated at 10, is shown as attached to the current core of an induction meter, such current core being labeled 12, so as to provide the desired compensation hereinbefore set forth. As can be seen from the FIGURES 2, 3, and 4 the overload compensation device 10 comprises a magnetic shunt element 14 and a short circuited conducting loop 16, substantially surrounding the magnetic shunt 14. In the preferred embodiment of the invention set forth in FIGURE 2, the short circuit conducting loop 16 takes the form of a bracket member which is used to affix the magnetic shunt 14 to the sides of the current core poles, such poles being indicated at 18 and 20. The desired mounting of the short circuit conducting loop 16 is provided by means of brackets 22 and 24, which are stamped out of the material used to make the short circuit conducting loop, as will clearly appear from a perusal of FIGURES 3 and 4 of the invention. Additionally, strap members 26, 28, 30 and 32 are also punched out of the bracket member 16, as especially shown in FIGURE 4, so that the shunt member 14 may be slid under the strap members and securely held in the bracket member 16.

Of course, it will be understood, while the showings of FIGURES 2, 3 and 4 illustrate the preferred embodiment of the invention of the overload compensation device 10, comprising the magnetic shunt 14 and the short circuit conducting loop 16, that other types of short circuit conducting loop could be provided. In the preferred embodiment, the magnetic shunt material 14 is made of a silicon steel, while the bracket member 16, that is, the short circuit conducting loop, is formed of copper to provide the desired short circuiting effect about the magnetic shunt 14. However, it will be readily understood that other materials could be utilized, were it desired.

Referring now to FIGURE 5, there is shown the present preferred means of mounting the overload compensation device 10 to the current core 12. As shown in FIGURE 5, the bracket member 22 is riveted to the side of pole 18, of current core 12 by means of the rivet 34. As will be understood, in order to prevent the rivet 34 from shorting out the various laminations of the current pole 18 a non-mangetic rivet is desired. Thus, an electromangetic connection is provided between the pole 18, the mounting bracket 16 and the magnetic shunt 14. Of course, it will be understood that, the bracket 24 is secured to pole 20, of current core 12 in a similar manner.

From the above it will be apparent that by means of the overload compensation device of this invention that the registration of an induction meter during overloads and at a lagging power factor has been brought into substantial agreement with the registration of the meter during overload at unity power factor. Thus, it can be seen that the overload compensation device of this invention performs all of the desired objects of this invention.

While the present preferred embodiment has been described in detail in this specification, it will, of course be understood that various changes may be made in the construction and the materials of the magnetic shunt and the short circuit conducting loop without departing from the spirit and scope of the invention, as defined in the appended claims.

What is claimed as new and which it is desired to secure by Letters Patent of the United States is:

1. An overload compensation device for an induction watt meter to improve the registration of electrical energy of lagging power factor when the meter is subjected to overloads, comprising a magnetic shunt means electromagnetically connected across the current core poles of the meter for shunting some of the flux flowing in said current core, a short circuit conducting loop surrounding a portion of said magnetic shunt means and operative to cause flux flowing in said shunt to lag at rated loads when said shunt is not saturated but having little effect on said flux in said shunt when said shunt is saturated at overloads, said short circuit conducting loop being in the form of strap members punched from and integral with a shunt supporting metal bracket secured to the sides of the poles of the current core, said magnetic shunt being secured to said bracket by said strap members.

2. An overload compensation device for an induction watt meter to improve the registration of electrical energy of lagging power factor when the meter is subjected to overloads, comprising, a metallic bracket member, said bracket member being secured to the sides of the poles of the current core member of the induction meter, said bracket having a plurality of strap members punched therefrom, a magnetic shunt means mounted in said strap members of said bracket and electromagnetically connected across the current core poles of the meter for shunting some of the flux across the current core poles, said bracket and said straps surrounding said magnetic shunt and operative as short circuit conducting loops to cause flux flowing in said shunt to lag at rated loads when said shunt is not saturated and having little effect on said flux in said shunt when said shunt is saturated at overloads.

References Cited by the Examiner

UNITED STATES PATENTS

| 1,806,331 | 5/31 | Callsen | 324—138 |
| 2,507,320 | 5/50 | Riordan | 324—137 |
| 2,813,252 | 11/57 | Leippe | 324—137 |

FOREIGN PATENTS

| 838,784 | 5/52 | Germany. |

WALTER L. CARLSON, *Primary Examiner.*